United States Patent [19]

Kogita et al.

[11] Patent Number: 5,712,736
[45] Date of Patent: Jan. 27, 1998

[54] UNDER VIEW MIRROR APPARATUS FOR A VEHICLE

[75] Inventors: Hidekazu Kogita, Kariya; Masumi Nishikawa, Toyoake; Shoji Okada, Anjo, all of Japan

[73] Assignee: Aisin Seiki Kabushiki Kaisha, Kariya, Japan

[21] Appl. No.: 692,397

[22] Filed: Aug. 5, 1996

Related U.S. Application Data

[63] Continuation of Ser. No. 380,432, Jan. 30, 1995, abandoned, which is a continuation of Ser. No. 92,521, Jul. 16, 1993, abandoned.

[30] Foreign Application Priority Data

| Jul. 23, 1992 | [JP] | Japan | 4-196975 |
| Aug. 28, 1992 | [JP] | Japan | 4-230284 |

[51] Int. Cl.$^6$ .............. G02B 5/08; G02B 7/182; B60R 1/06
[52] U.S. Cl. ............ 359/841; 359/872; 359/877
[58] Field of Search ............... 359/841, 843, 359/844, 872, 873, 877

[56] References Cited

U.S. PATENT DOCUMENTS

| 3,468,218 | 9/1969 | Schimmelpfenning | 359/841 |
| 3,612,667 | 10/1971 | Linden | 359/841 |
| 3,820,877 | 6/1974 | Moyer | 359/841 |
| 4,469,405 | 9/1984 | Chin-Wun | 359/841 |
| 4,758,078 | 7/1988 | Bracamonte | 359/841 |
| 4,911,545 | 3/1990 | Miller | 359/841 |
| 4,936,669 | 6/1990 | Wun | 359/841 |
| 4,936,670 | 6/1990 | Yoo | 350/604 |
| 5,056,904 | 10/1991 | Okamura | 359/841 |
| 5,210,652 | 5/1993 | Perkinson | 359/841 |
| 5,337,190 | 8/1994 | Kogita et al. | 359/877 |
| 5,497,273 | 3/1996 | Kogita et al. | 359/877 |
| 5,537,263 | 7/1996 | Kogita et al. | 359/843 |

FOREIGN PATENT DOCUMENTS

| 0 153 743 | 9/1985 | European Pat. Off. . | |
| 2 543 083 | 9/1984 | France . | |
| 2 663 595 | 12/1991 | France . | |
| 2 681 821 | 4/1993 | France . | |
| 0808530 | 1/1952 | Germany | 359/841 |
| 37 18 125 | 8/1988 | Germany . | |
| 40 11 150 | 10/1991 | Germany . | |
| 0004440 | 1/1982 | Japan | 359/841 |
| 0194640 | 11/1983 | Japan | 359/841 |
| 59-50834 | 3/1984 | Japan . | |
| 0179350 | 9/1985 | Japan | 359/841 |
| 0150849 | 7/1986 | Japan | 359/841 |
| 61-146653 | 7/1986 | Japan . | |
| 62-4441 | 1/1987 | Japan . | |
| 1-127430 | 5/1989 | Japan . | |
| 2-208143 | 8/1990 | Japan . | |
| 3-28342 | 4/1991 | Japan . | |
| 4-39140 | 2/1992 | Japan . | |
| 0911251 | 11/1962 | United Kingdom | 359/841 |

*Primary Examiner*—Ricky D. Shafer
*Attorney, Agent, or Firm*—Burns, Doane, Swecker & Mathis, LLP

[57] ABSTRACT

An under view mirror apparatus for a vehicle comprises a mirror structure mountable on a rear portion of a vehicle and selectively positionable in either a first condition in which the mirror structure is stored in the rear portion of the vehicle or a second condition in which the mirror structure projects out from the rear portion of the vehicle. The first operating mechanism is adapted to be disposed between one side of the mirror structure and the rear portion of the vehicle, while the second operating mechanism is adapted to be disposed between the other side of the mirror structure and the rear portion of the vehicle. A driving mechanism which is adapted to be disposed in the rear portion of the vehicle is connected to the first operating mechanism, a driven mechanism which is adapted to be disposed in the rear portion of the vehicle is connected to the second operating mechanism, and a connecting member which is adapted to be disposed in the rear portion of the vehicle is connected to the driving mechanism and the driven mechanism.

10 Claims, 15 Drawing Sheets

UNDER VIEW MIRROR APPARATUS FOR A VEHICLE

This application is a continuation of application Ser. No. 08/380,432, filed Jan. 30, 1995, now abandoned, which is a continuation of application Ser. No. 08/092,521, filed Jul. 16, 1993, now abandoned.

BACKGROUND OF THE INVENTION

1. Field of the Invention

This invention relates to an under view mirror apparatus for a vehicle which is disposed on a rear portion of the vehicle for the purpose of securing and advancing the visibility in the rear portion of the vehicle. Furthermore this invention relates to an under view mirror apparatus for a vehicle which can be selectively operated in either an unoperational condition in which the apparatus is stored in a deflecter disposed on the rear portion of the vehicle or an operational condition in which the apparatus projects out from the deflecter.

2. Description of the Related Art

A conventional under view mirror apparatus for a vehicle is disclosed in Japanese Patent Laid Open No. 1-127430. That under view mirror apparatus is shown in FIGS. 15 and 16 herein and comprises a mirror structure 101, a first operating mechanism 102a, a second operating mechanism 102b and a driving mechanism (not shown) which drives the first operating mechanism 102a. The first operating mechanism 102a is disposed on one side of the mirror structure 101 and the second operating mechanism 102b is disposed on the other side of the mirror structure 101. The first operating mechanism 102a and the second operating mechanism 102b each includes a belt pulley, a link and a timing belt.

The mirror structure 101 is disposed on a deflecter 100 through the first operating mechanism 102a and the second operating mechanism 102b. The second operating mechanism 102b is operated by the operation of the first operating mechanism 102a through the mirror structure 101. The minor structure 101 is moved by the operation of the first operating mechanism 102a. The minor structure 101 is selectively operated between an unoperational condition in which the minor structure 101 is stored in a concave portion 100a of the deflecter 100 and an operational condition in which the apparatus projects out from the concave portion 100a of the deflecter 100. The minor structure 101 comprises a convex minor 101a which reflects rear and lower portions of the vehicle.

In this mirror apparatus, the second operating mechanism 102b cannot be synchronized with the first operating mechanism 102a when the mirror structure 101 is made large in size in order to broaden the visibility. The minor structure 101 is not able to be moved smoothly and often inclines when the minor structure 101 is moved. Consequently, the minor structure 101 often interferes with the deflecter 100 in the unoperational condition and the under minor apparatus sometimes can not provide visibility.

Furthermore, a mirror case 101b is disposed behind the convex minor 101a and includes an extending portion 101c which extends toward the lower portion of the vehicle. A width of the extending portion 101c in the lateral direction of the vehicle is formed to be approximately equal to that of the concave portion 100a. A portion 100b located at a lower portion of the concave portion 100a is covered with the extending portion 101c in the unoperational condition.

Both sides of the extending portion 101c obstruct the portion of the convex mirror 101a shown in FIG. 15 as the shaded portion, because the thickness of the convex mirror 101a is less than the height of the extending portion 101c at both sides. Therefore, this prevents the under view mirror apparatus from providing visibility in the rear portion of the vehicle.

An alternative prior art embodiment of the under view mirror apparatus for a vehicle is shown in FIG. 16. This under view mirror apparatus for a vehicle comprises a mirror case 101f including an extending portion 101g. The extending portion 101g possesses a configuration such that the shaded portion in FIG. 15 is removed from the extending portion 101c in order that the center thickness of the convex mirror 101a is approximately equal to the height of the extending portion 101c and the height of the extending portion 101g is slowly reduced toward the respective sides of the extending portion 101c. A wall portion 100c is provided at the portion 100b and stands upwardly. The height of the wall portion 100c is slowly increased toward the respective sides thereof.

Because a pair of projecting portions 101e are disposed in order to respectively cover the first operating mechanism 102a and the second operating mechanism 102b in the unoperational condition, the mirror structure 101a reflects the projecting portions 101e when the mirror is in the operational condition. Therefore the projecting portions 101e prevent the apparatus from providing visibility of the rear and lower portions of the vehicle. Furthermore the projecting portions 101e are obstacles to an attractive appearance.

SUMMARY OF THE PRESENT INVENTION

It is an object of the present invention to provide an improved under view mirror apparatus for a vehicle in which a mirror structure is not inclined when the mirror structure moves.

It is another object of the present invention to provide an improved under view mirror apparatus for a vehicle which provides visibility in the rear portion of a vehicle.

It is a further object of the present invention to provide an improved under view mirror apparatus for a vehicle which prevents a mirror structure from being broken.

It is a further object of the present invention to provide an improved under view mirror apparatus for a vehicle which maintains an attractive appearance.

It is a further object of the present invention to provide an improved under view mirror apparatus for a vehicle which is simple in structure and small in size.

It is a further object of the present invention to provide an improved under view mirror apparatus for a vehicle which is lower in cost.

To achieve the above mentioned objects, an under view mirror apparatus for a vehicle in accordance with this invention comprises a mirror structure for being mounted on a rear portion of a vehicle and for being selectively operated between a first condition in which the mirror structure is stored in the rear portion of the vehicle and a second condition in which the mirror structure projects out from the rear portion of the vehicle, a first operating mechanism adapted to be disposed between one side of the mirror structure and the rear portion of the vehicle, a second operating mechanism adapted to be disposed between the other side of the mirror structure and the rear portion of the vehicle, a driving mechanism for being disposed in the rear portion of the vehicle and connected with the first operating mechanism, a driven mechanism for being disposed in the rear portion of the vehicle and connected with the second operating mechanism, and a connecting member for being disposed in the rear portion of the vehicle to connect the driving mechanism with the driven mechanism.

BRIEF DESCRIPTION OF THE DRAWINGS

The features and advantages of the under view mirror apparatus for a vehicle according to the present invention will be more clearly appreciated from the following description in conjunction with the accompanying drawings wherein.

DETAILED DESCRIPTION OF PREFERRED EMBODIMENTS OF THE INVENTION

Figure 1:
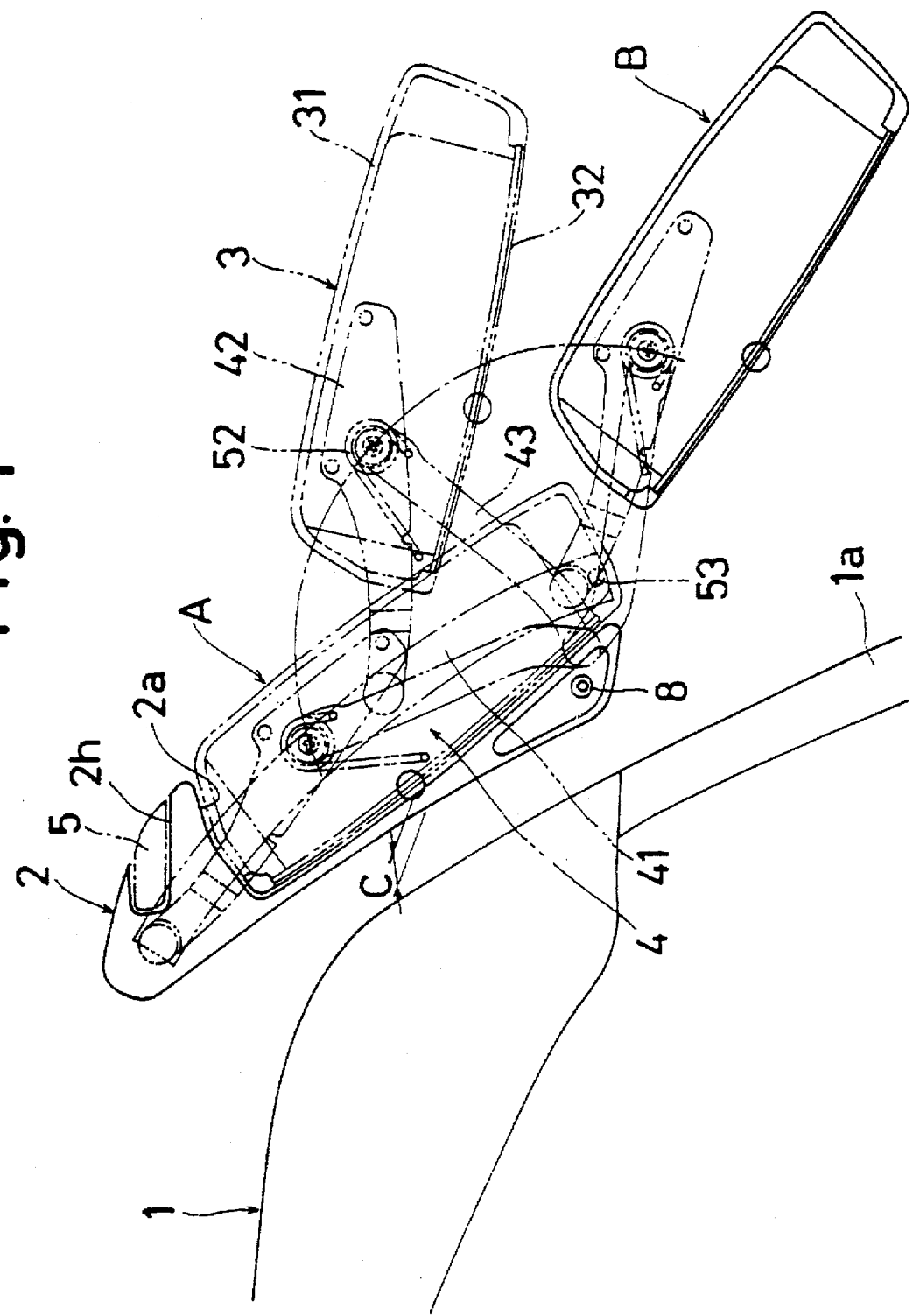
FIG. 1 is a sectional view of an under view mirror apparatus for a vehicle of the present invention taken along the line 1—1 of FIG. 11.
Figure 2:
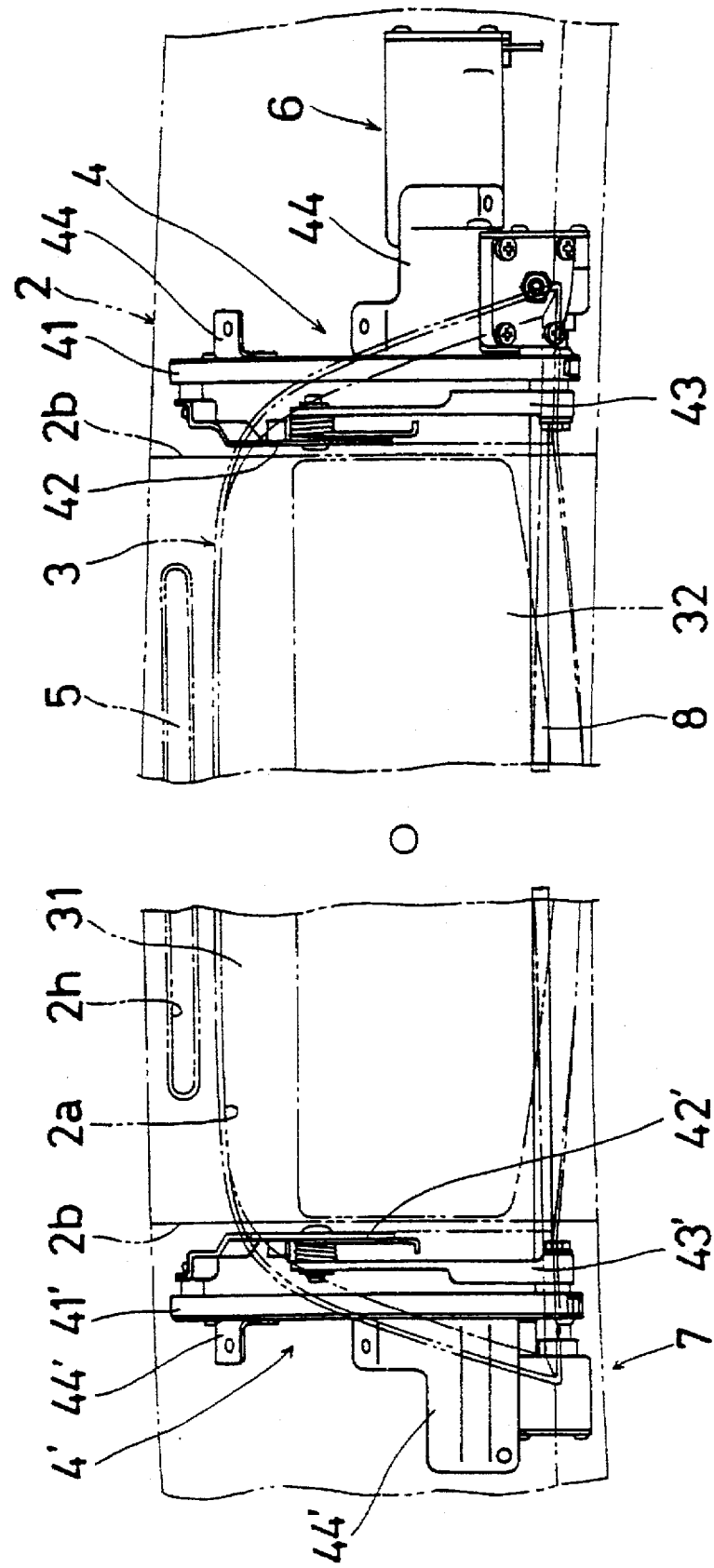
FIG. 2 is a plan view of an under view mirror apparatus for a vehicle shown in FIG. 1.
Figure 3:
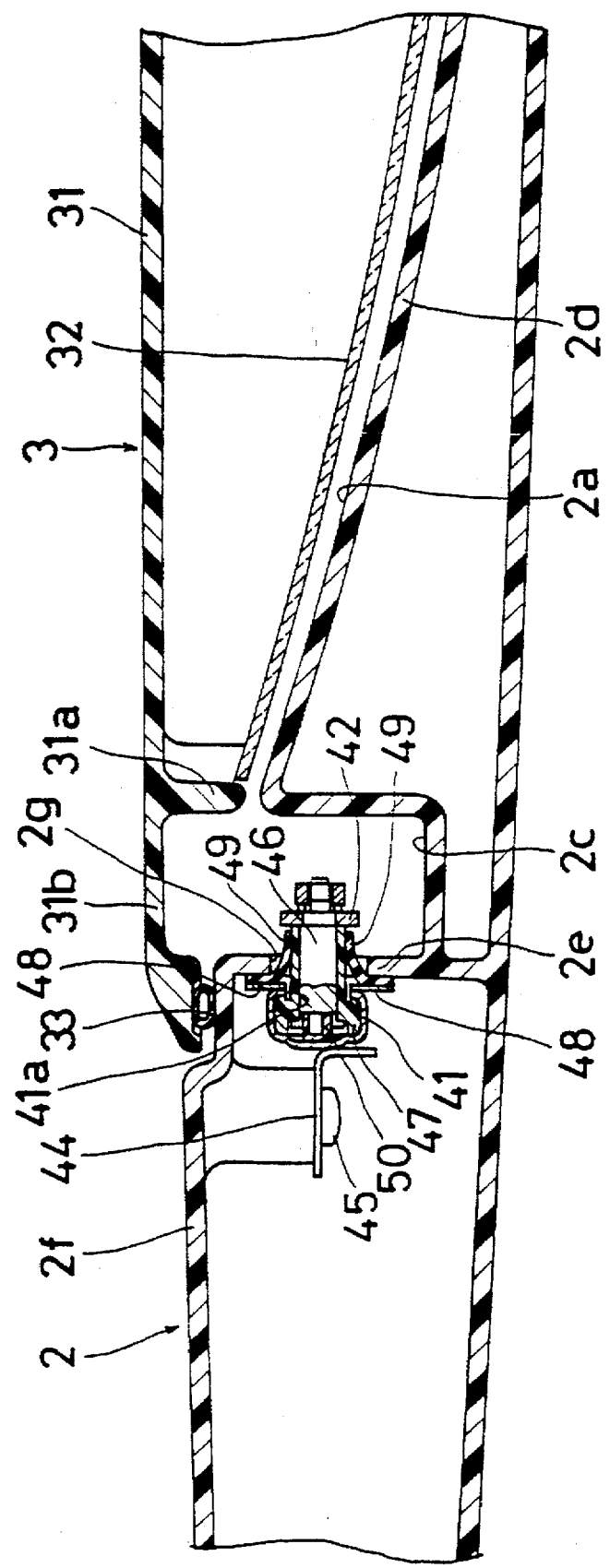
FIG. 3 is a partial sectional view of an under view mirror apparatus for a vehicle of the present invention.
Figure 4:
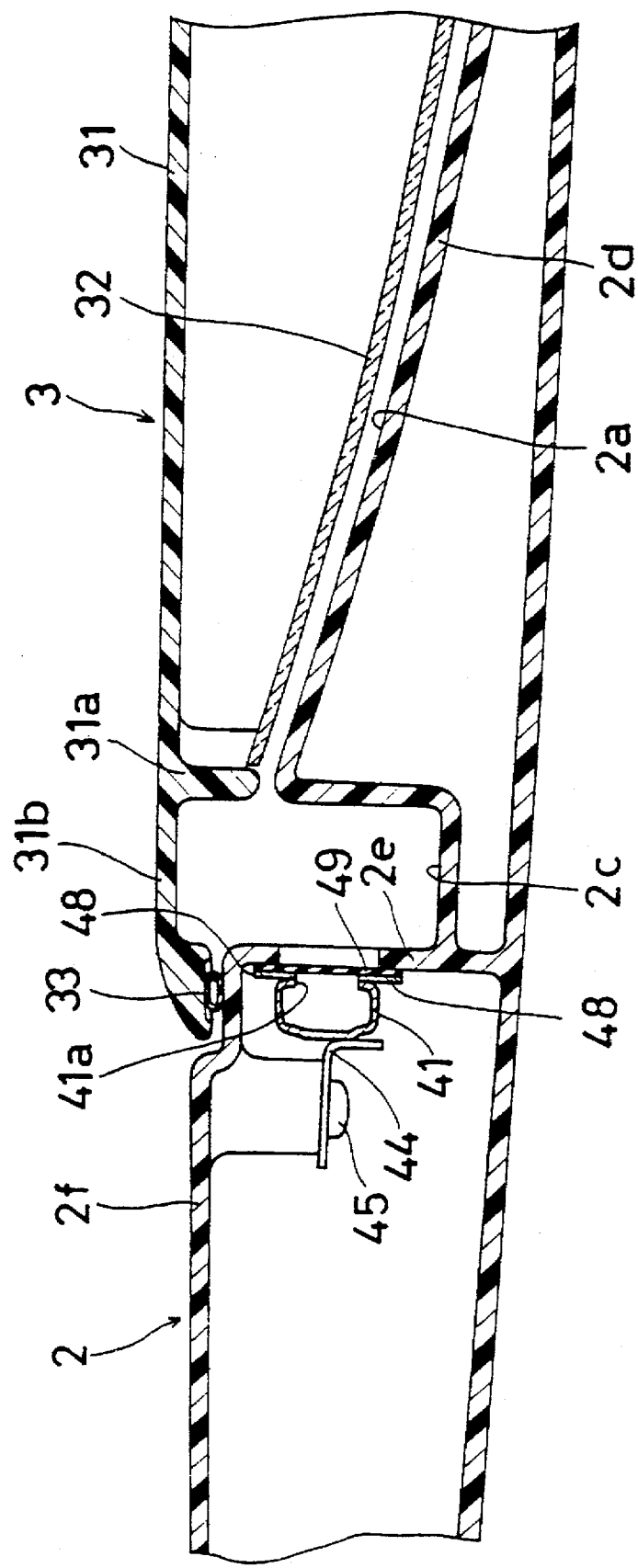
FIG. 4 is the other partial sectional view of an under view mirror apparatus for a vehicle of the present invention.

FIGS. 1 and 2 show a rear window 1a disposed on the rear portion of a vehicle 1 and a deflecter 2, as a hollow member, fixed on the upper portion of the rear window 1a. When the vehicle is moving, the deflecter 2 modifies the flow of air which streams at the rear portion of the vehicle so that the air resistance may be reduced. The deflecter 2 blows air on the rear window 1a so that the rear window 1a may be cleaned, especially by removing rain drops. The deflecter 2 comprises the first concave portion 2a, a pair of second concave portions 2b disposed at both sides of the first concave portion 2a and the third concave portion 2h disposed at the upper portion of the first concave portion 2a. The first concave portion 2a is capable of receiving a movable member 3 (described later), as a mirror structure, and each of the second concave portions 2b respectively receives the first operating mechanism 4 and the second operating mechanism 4' (described later) each of which supports the movable member 3 on the deflecter 2. A braking lamp 5 which is connected with the braking operation of the vehicle 1 is received in the third concave portion 2h. The first operating mechanism 4 and the second operating mechanism 4' move the movable member 3 between the unoperational condition (as A shown in FIG. 1) in which the movable member 3 is received in the deflecter 2 and the operational condition (as B shown in FIG. 1) in which the movable member 3 projects out from the deflecter 2.

In FIGS. 1, 2, 3 and 4 the movable member 3 is formed with a movable body 31 and a convex mirror 32. The movable body 31 constitutes a part of the outer housing of the deflecter 2 when the movable member 3 is in the unoperational condition A. The convex mirror 32 is fixed on a standing wall 31a of the movable body 31 at the circumference thereof. The convex mirror 32 is covered with the deflecter 2 and a bottom wall 2d formed with the first concave portion 2a when the movable member 3 is in the unoperational condition A. The convex mirror 32 reflects the rear and lower portion of the vehicle when the movable member 3 is in the operational condition B. The movable body 31 includes a lapping portion 31b which covers the second concave portions 2b and overlaps an outer wall 2f in the unoperational condition A. The lapping portion 31b includes a sealing member 33 which contacts the outer wall 2f and provides a seal between the outer wall 2f and the lapping portion 31b. The sealing member 33 prevents rain water and dust from going between the deflecter 2 and the movable member 3. Furthermore, the sealing member 33 keeps the convex mirror 32 clean and prevents incomplete operation of the movable member 3 and the first operating mechanism 4 due to a freeze thereof.

Figure 5:
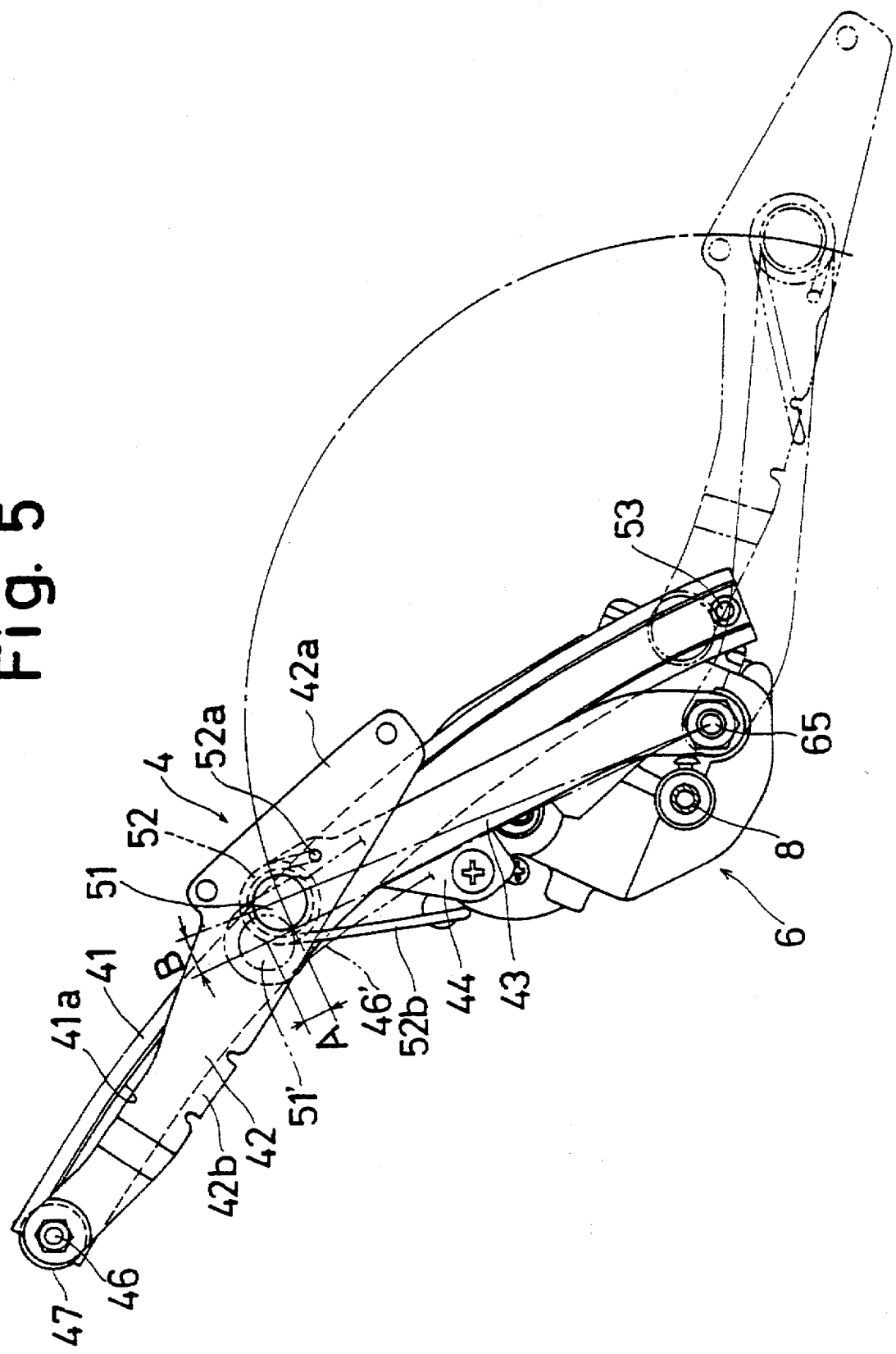
FIG. 5 is a side view of the first operating mechanism of an under view mirror apparatus for a vehicle of the present invention.

In FIGS. 2 and 5 the first operating mechanism 4 includes a guide rail 41, a first link 42 and a second link 43. The first link 42 is slidably fixed on the guide rail 41 and is connected to one side of the movable member 3. The second link 43 is connected to the first link 42 and a driving mechanism 6 (described later). On the other hand, in FIG. 8 the second operating mechanism 4' includes a guide rail 41', a first link 42' and a second link 43'. The first link 42' is slidably fixed on the guide rail 41' and is connected to the other side of the movable member 3. The second link 43' is connected to the first link 42' and a driven mechanism 7 (described later).

Referring to the first operating mechanism 4, in FIGS. 2 to 7 the guide rail 41 extends in the vertical direction of the deflecter 2. The guide rail 41 possesses a C-shaped configuration in section and an arch shape in the longitudinal direction. The guide rail 41 is fixed on the deflecter 2 by screws 45 which pass through brackets 44. The guide rail 41 includes an opening 41a which is opposed to a side wall 2e which constitutes the second concave portion 2c. The side wall 2e includes a slit 2g which is formed in the longitudinal direction of the guide rail 41 and which is opposed to the opening 41a. Furthermore, the opening 41a is covered with a pair of sealing members 49 which are disposed between a plate member 48 fixed on the guide rail 41 and the side wall 2e. The sealing members 49 prevent rain water and dust from going into the guide rail 41. Corrosion of the guide rail 41 and outflows of grease are thereby prevented.

A pin 46 extending into the guide rail 41 through the slit 2g and the opening 41a stands on the first link 42. A roller 47 is rotatably disposed around the pin 46 and is slidably supported on the guide rail 41. Therefore, the first link 42 is slidably supported on the guide rail 41 through the pin 46 and the roller 47. Furthermore, a cushion member 50 slidably contacting the bottom wall of the guide rail 41 is fixed on one end of the pin 46. The cushion member 50 fills up a clearance between the guide rail 41 and the roller 47 so the roller 47 maintains smooth sliding movement. The sealing members 49 are elastic and formed into a tapered-shaped configuration in section with one end of each of the sealing members 49 being in close contact with the pin 46. The roller 47 slides along in the guide rail 41 spreading out the sealing members 49 when the first link 42 is moved along the guide rail 41. A bracket portion 42a is disposed at one end of the first link 42 and is fixed on the standing wall 31a of the movable body 31 by screws (not shown in FIGURES). Therefore, the first link 42 is connected with the movable member 3. Furthermore a stopping member 53 which is able to contact the roller 47 is disposed on the lower end of the guide rail 41. The stopping member 53 restricts the movement of the second link 43.

Figure 8:
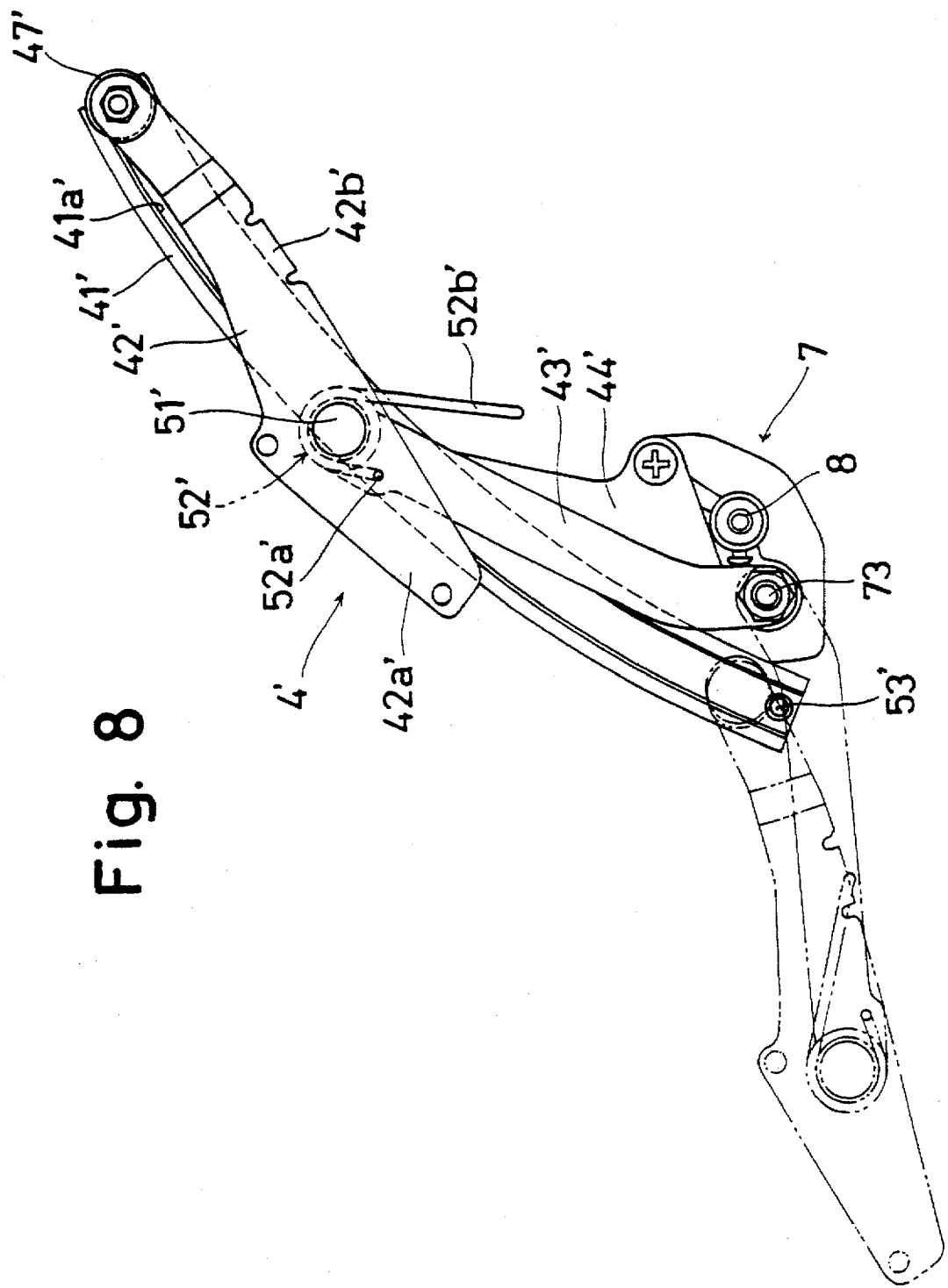
FIG. 8 is a side view of the second operating mechanism of an under view mirror apparatus for a vehicle of the present invention.

One end of the second link 43 is rotatably supported on the first link 42 by a screw 51 so that the second link 43 is connected with the first link 42. A spring member 52 is disposed around the screw 51. One end 52a of the spring member 52 engages an engaging hole of the second link 43 and the other end 52b of the spring member 52 is able to contact the bracket portion 42b which is disposed on the first link 42. In FIGS. 5 and 8 the second link 43' of the second operating mechanism 4' is larger than the second link 43 of the first operating mechanism 4 with respect to a predetermined length A and is inclined with a predetermined angle B in comparison with the second link 43 of the first operating mechanism 4. Therefore, the first operating mechanism 4 can be synchronized with the second operating mechanism 4'. In contrast, one end of the second link 43 may support the movable member 3. In case of this, the other end of the first link 42 is fixed to the lower side of the movable member 3 (the lower side of the movable member 3 under the condition A shown in FIG. 1) and one end of the second link 43 is fixed to the upper side of the movable member 3 (the upper side of the movable member 3 under the condition B shown in FIG. 1). The description of the details of the second operating mechanism 4' are omitted because the second operating mechanism 4' is similar to the first operating mechanism 4. However, for ease in understanding, the portions of the second operating mechanism 4' which correspond to portions of the first operating mechanism are provided with the same reference elements, but are distinguished through use of a prime designation.

Figure 6:
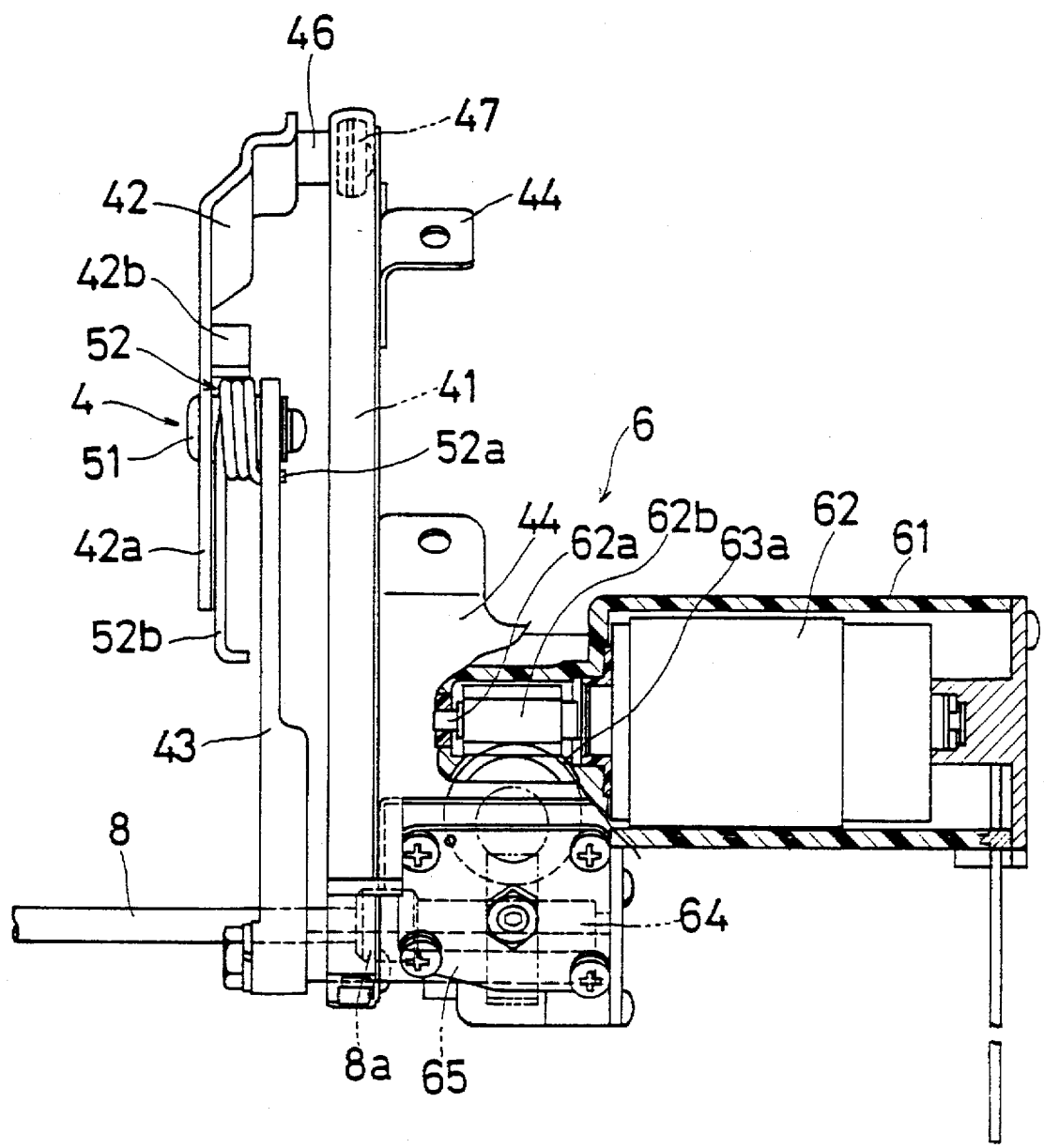
FIG. 6 is an elevational view with a partial sectional view of the first operating mechanism shown in FIG. 5.
Figure 7:
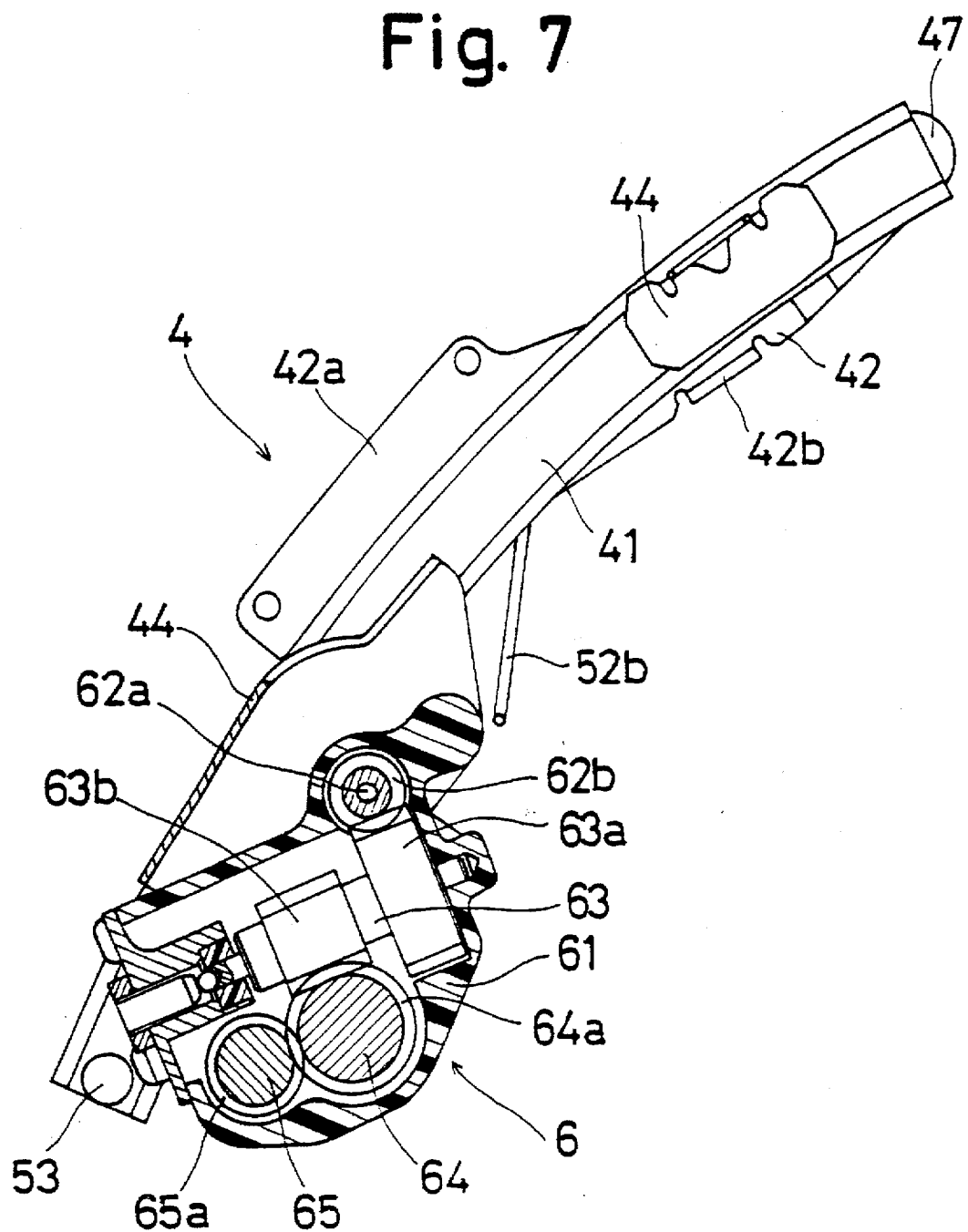
FIG. 7 is a side plan view with a partial sectional view of the first operating mechanism shown in FIG. 5.

Referring to the driving mechanism 6, in FIGS. 6 and 7 the driving mechanism 6 is received in a case 61 which is fixed to the bracket 44. Therefore the driving mechanism 6 is disposed in the deflecter 2. An electric motor 62 is housed in the case 61 and an output shaft 62a is connected to a first worm gear 62b. A transmitting shaft 63 is rotatably supported in the case 61 by conventional bearing mechanisms and the transmitting shaft 63 is formed integrally with the first gear 63a which engages a first worm gear 62b and a second worm gear 63b. A first output shaft 64 and a second output shaft 65 are each rotatably supported in the case 61 by conventional bearing mechanisms. The first output shaft 64 is formed integrally with a second gear 64a. The second output shaft 65 is formed integrally with a third gear 65a. The second gear 64a engages both the second worm gear 63b and the third gear 65a. One end of each of the first output shaft 64 and the second output shaft 65 extends out of the case 61 through a bore of the case 61, and one end of the second output shaft 65 is connected to the other end of the second link 43 by a nut. Therefore, the driving mechanism 6 is connected with the second link 43. A connecting shaft or connecting member 8 is disposed in the deflecter 2 in the longitudinal direction of the movable member 3. One end of the first output shaft 64 is connected to the connecting shaft 8 by a collar 8a.

Figure 9:
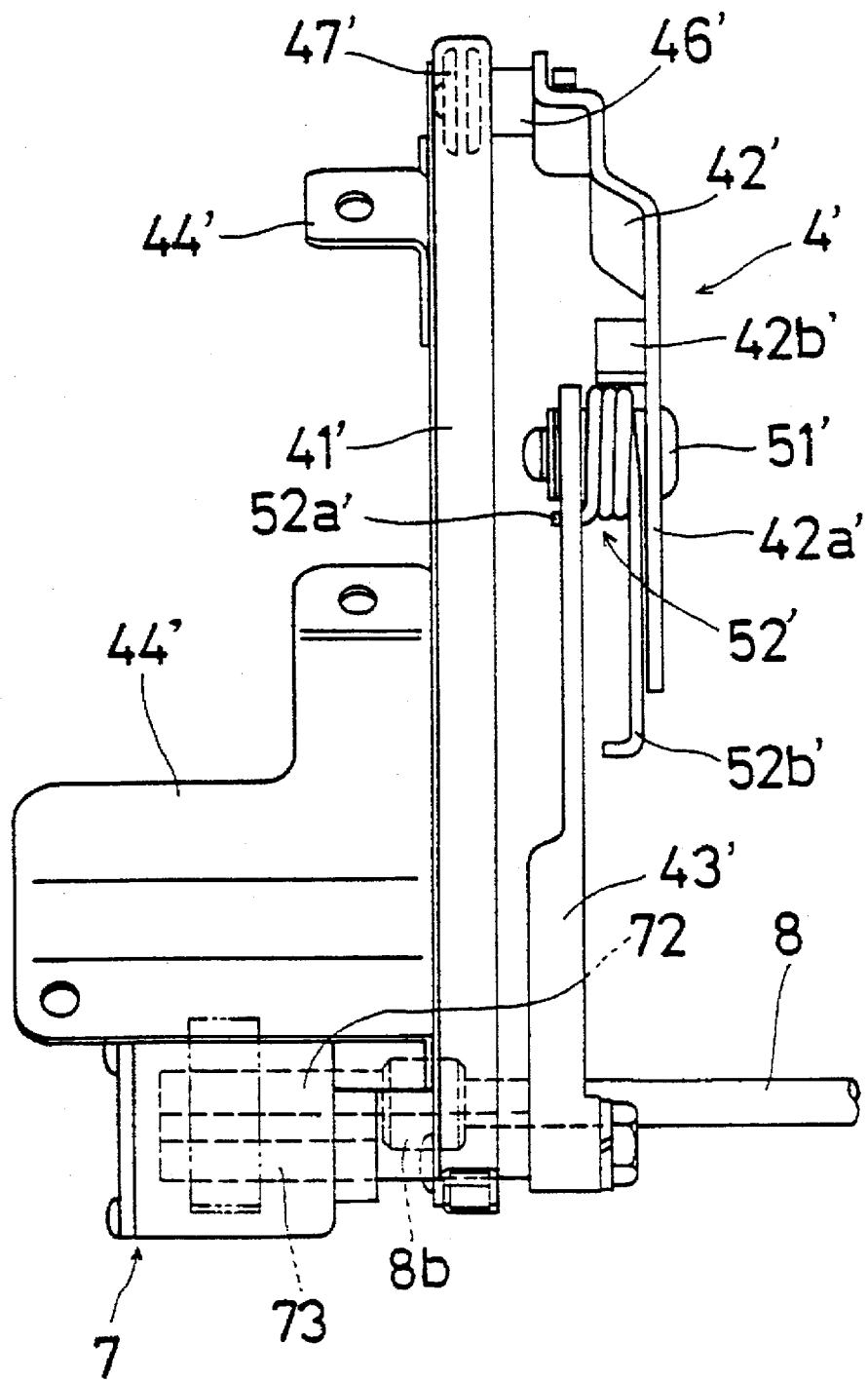
FIG. 9 is an elevational view of the second operating mechanism shown in FIG. 8.
Figure 10:
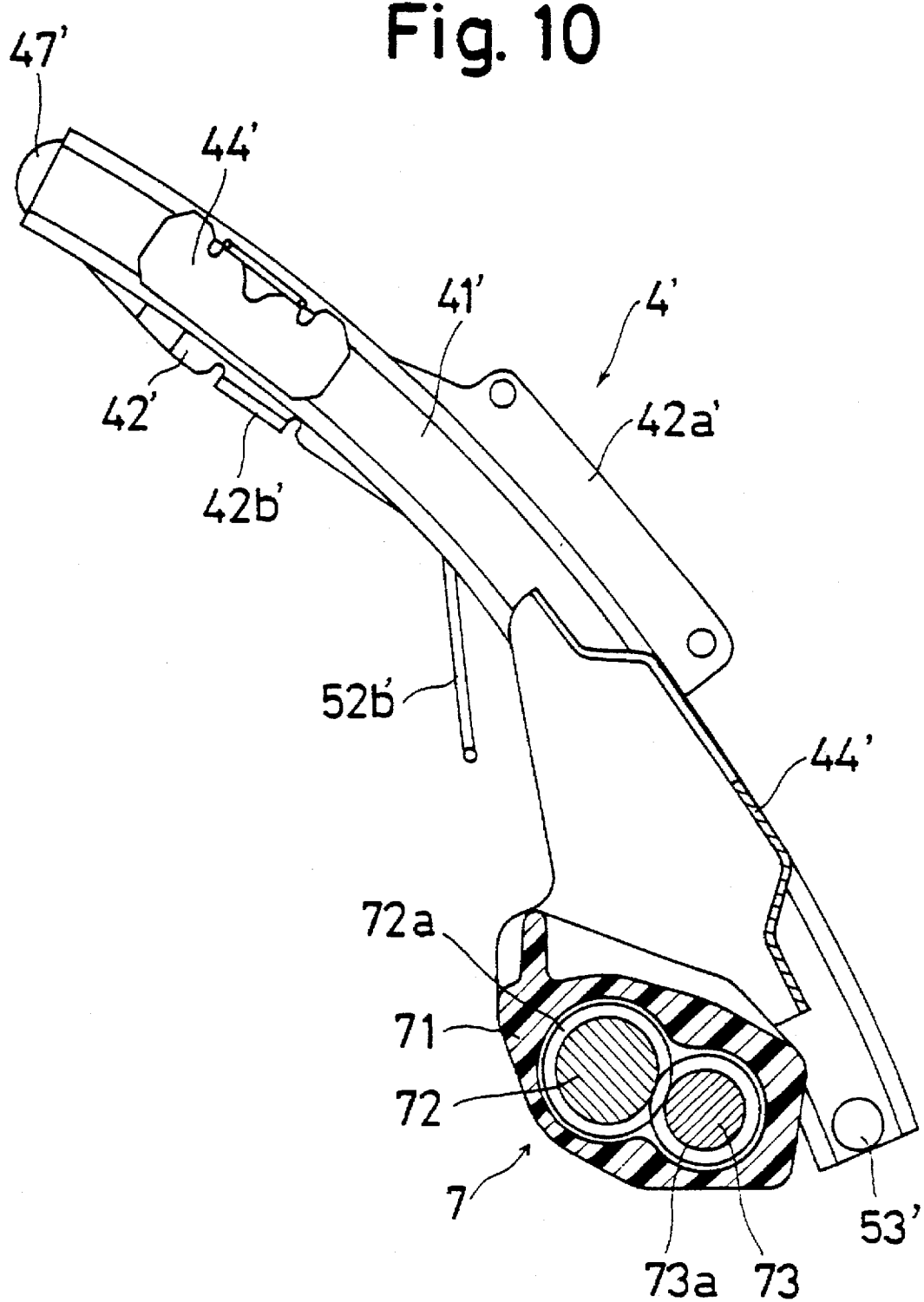
FIG. 10 is a side elevational view with a partial sectional view of the second operating mechanism shown in FIG. 8.

Referring to the driven mechanism 7, in FIGS. 9 and 10 the driven mechanism 7 is received in a case 71 which is fixed to the bracket 44'. Therefore, the driven mechanism 7 is disposed in the deflecter 2. A third output shaft 72 and a fourth output shaft 73 are each rotatably supported in the case 71 by conventional bearing mechanisms. The third output shaft 72 and the fourth output shaft 73 are formed integrally with a respective fourth gear 72a and fifth gear 73a. The fourth gear 72a engages the fifth gear 73a. One end of each of the third output shaft 72 and the fourth output shaft 73 extends out of the case 71 through a bore in the case 71 and one end of the fourth output shaft 73 is connected to the other end of the second link 43' by a nut. One end of the fourth output shaft 73 is connected to the connecting shaft 8 by a collar 8b. Therefore, the driving mechanism 6 is connected with the driven mechanism 7. Consequently, the driving mechanism 6 drives directly the first operating mechanism 4 and the second operating mechanism 4' without the medium of the movable member 3 and the second operating mechanism 4' is synchronized with the first operating mechanism 4. Therefore, the movable member 3 is moved by the first operating mechanism 4 and the second operating mechanism 4' at both sides thereof.

Figure 11:
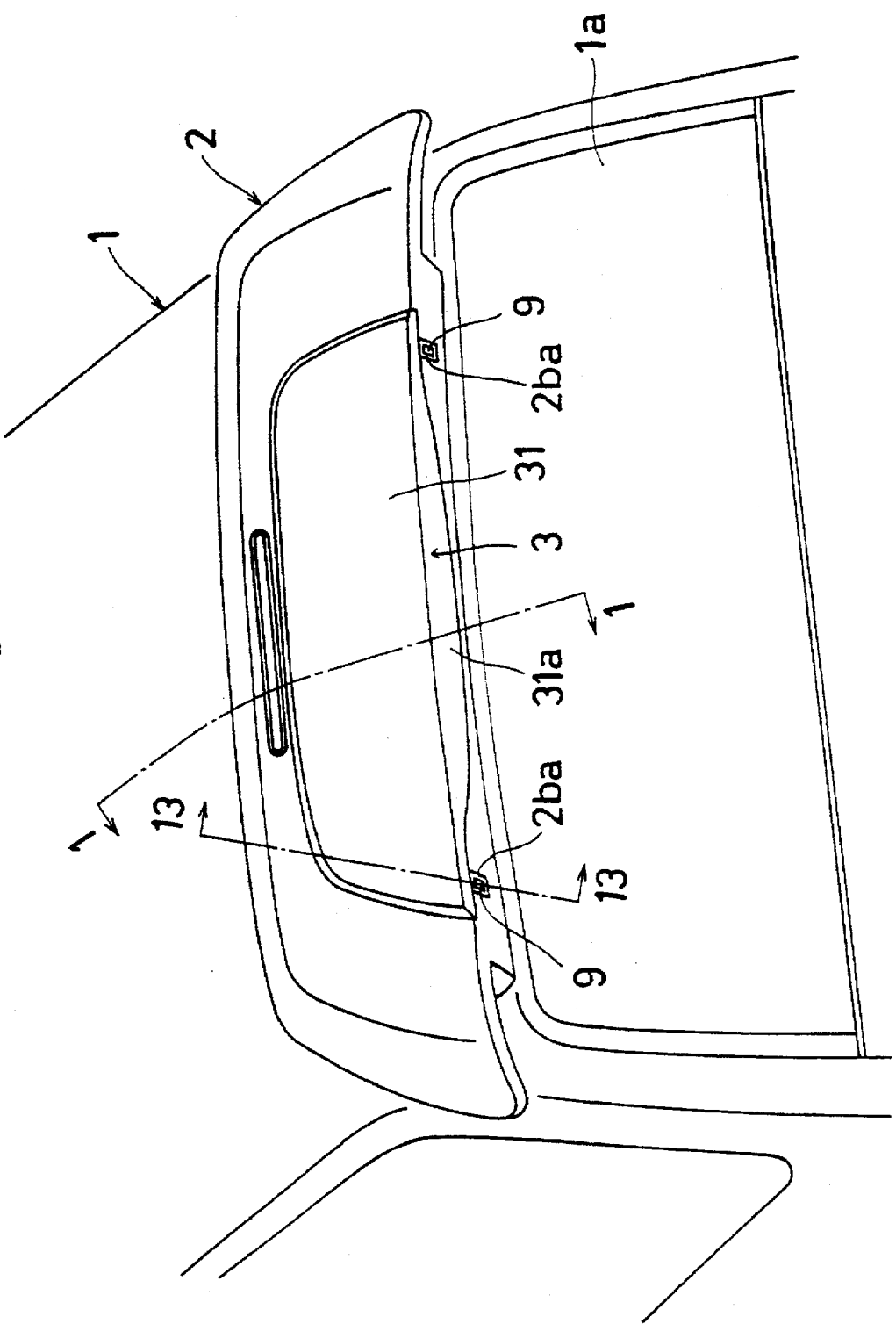
FIG. 11 is a perspective view of an under view mirror apparatus for a vehicle of the present invention under the unoperational condition.
Figure 13:
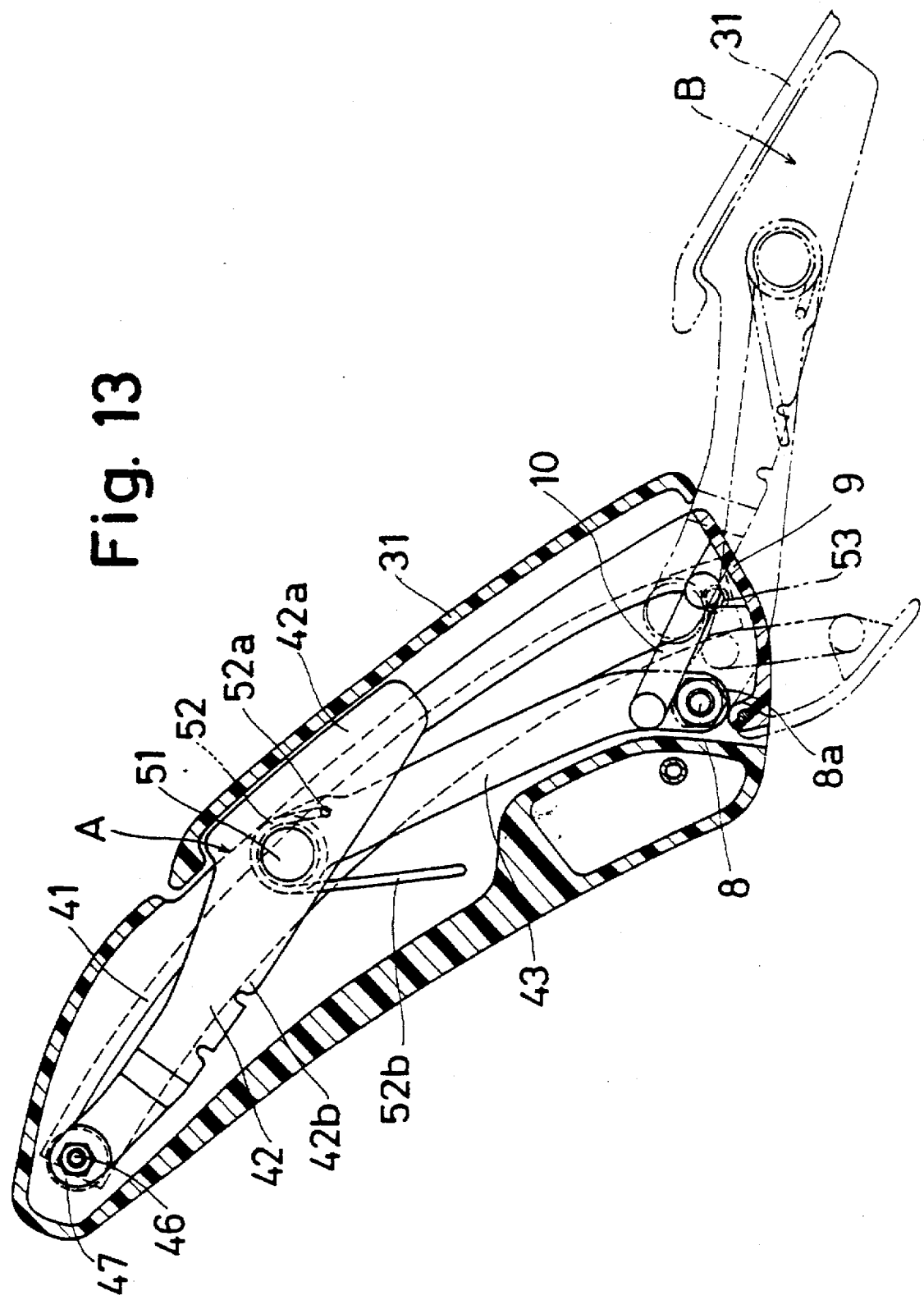
FIG. 13 is a sectional view of an under view mirror apparatus of the present invention taken along the line 13—13 of FIG. 11.

In FIGS. 11 and 13 a cover 9 is rotatably disposed nearby the second link 43 of the first operating mechanism 4. The cover 9 is opposed to a lower portion 2ba which is disposed at the lower portion of the second concave portion 2b. The cover 9 covers the lower portion 2ba in the unoperational condition A of the movable member 3. The third link 10 is connected with one end of the cover 9 and the other end of the second link 43. Furthermore a structure of the cover 9 which is disposed at the side of the second operating mechanism 4' is similar to the structure of the cover 9 which is disposed at the side of the first operating mechanism 4.

Figure 14:
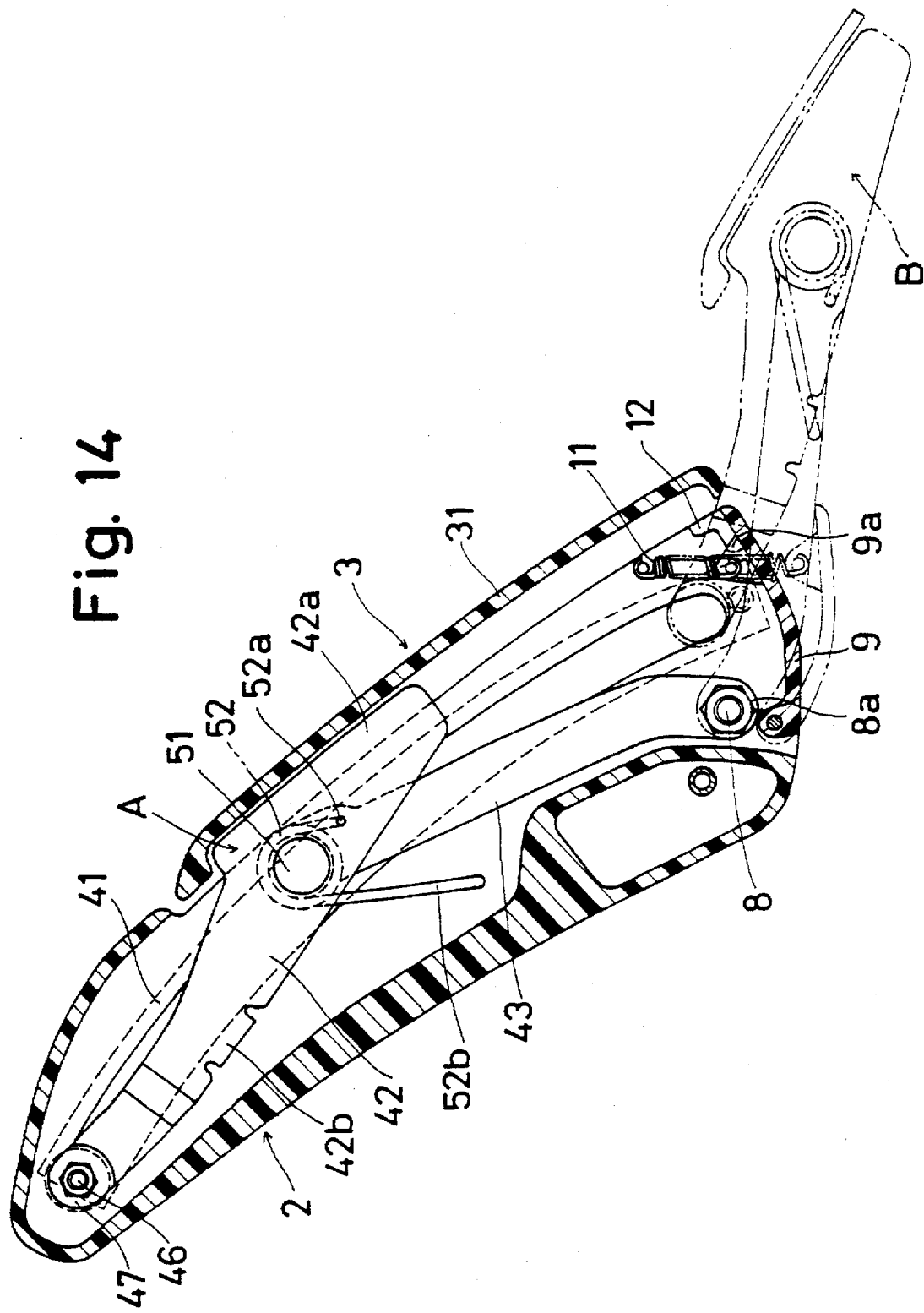
FIG. 14 is a sectional view of an alternative embodiment of an under view mirror apparatus for a vehicle of the present invention shown in FIG. 13.
Figure 15:
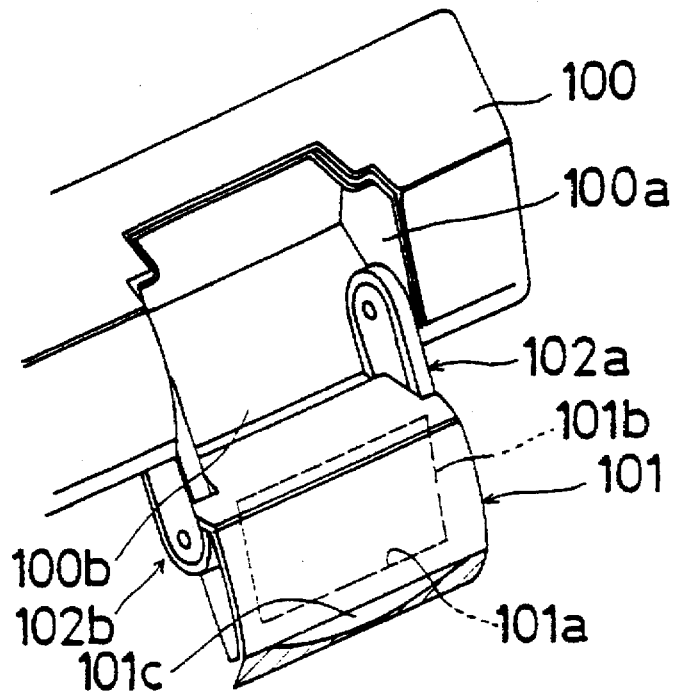
FIG. 15 is a perspective view of a prior art under view mirror apparatus for a vehicle under the operational condition.
Figure 16:
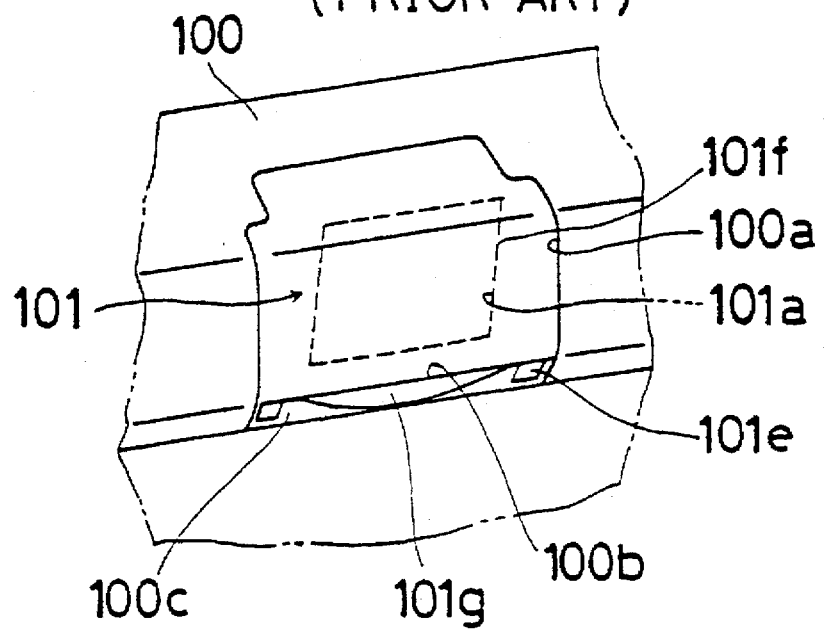
FIG. 16 is a perspective view of a prior art under view mirror apparatus for a vehicle under the unoperational condition.

An alternative embodiment of the present invention is shown in FIG. 14. One end of a spring member 11 is engaged with the lower portion of the guide rail 41 of the first operating mechanism 4. The other end of the spring member 11 is fixed on the cover 9 through a bracket portion 9a which is disposed on the cover 9. The spring member 11 always forces the cover 9 in the upper direction of the vehicle 1. A stopping portion 12 is fixed on the deflecter 2 so that the stopping portion 12 may prevent the cover 9 from rotating in the upper direction of the vehicle 1 by engaging the end of the cover 9 under the unoperational condition A of the movable member 3. Therefore the cover 9 is maintained by the spring member 11 and the stopping portion 12 so as to oppose the lower portion 2ba. Furthermore a structure of the cover 9 which is disposed at the side of the second operating mechanism 4" is similar to the structure of the cover 9 which is disposed at the side of the first operating mechanism 4. One end of the spring member 9 may be fixed on the deflecter 2 and the other end of the spring member 9 may be fixed on the cover 9 instead of the above mentioned structure.

Figure 12:
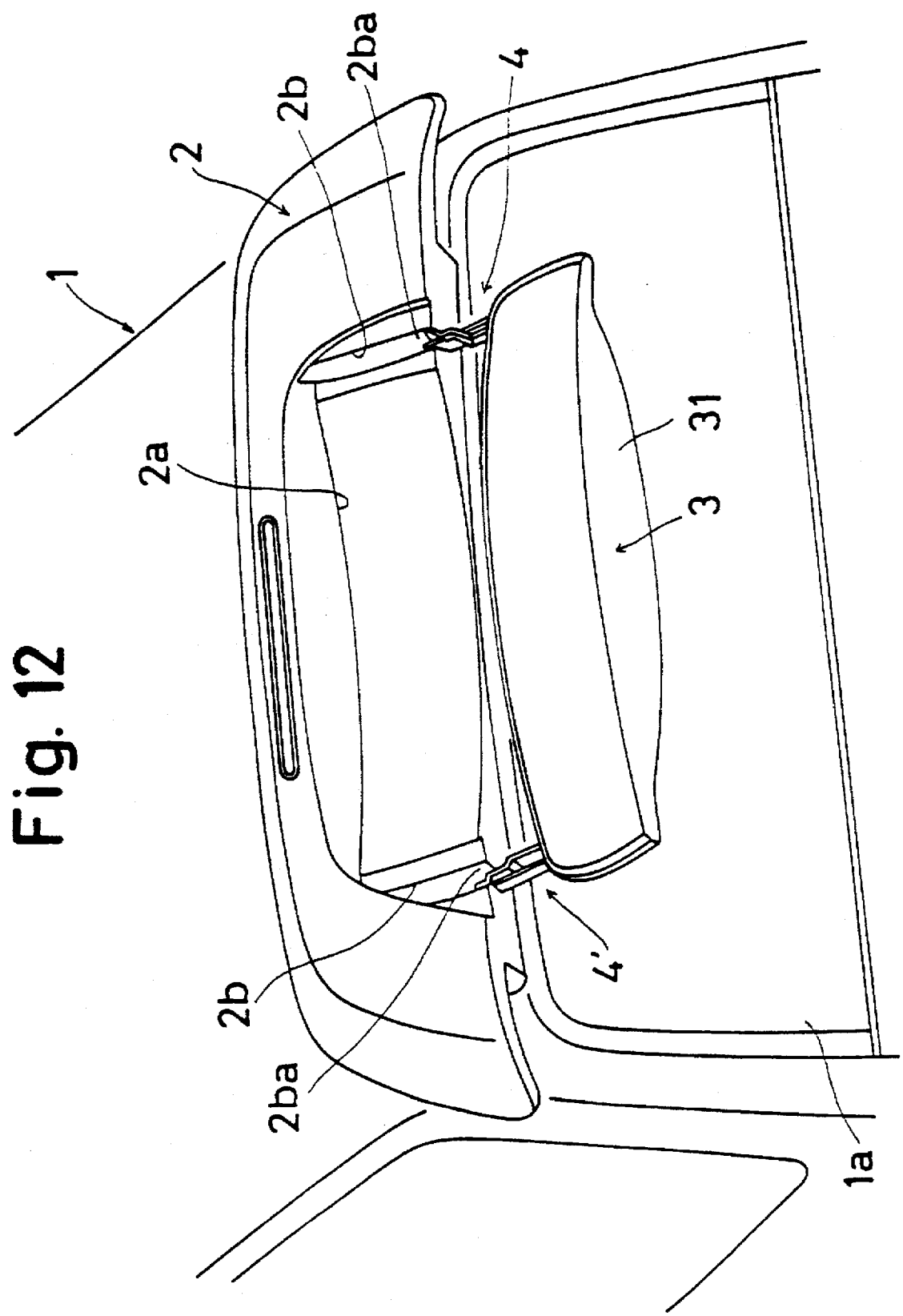
FIG. 12 is a perspective view of an under view mirror apparatus for a vehicle of the present invention under the operational condition.

The operation of the under view mirror apparatus for a vehicle according to the present invention will be described hereinafter. When the electric motor 62 is driven with the movable member 3 in the unoperational condition A, the first output shaft 64 and the second output shaft 65 are driven through the transmitting shaft 63. The rotational operation of the second output shaft 65 is transmitted to the first operating mechanism 4. The rotational operation of the first output shaft 64 is transmitted to the driven mechanism 7 through the connecting shaft 8. The rotational operation of the third output shaft 72 is transmitted to the second operating mechanism 4' through the fourth output shaft 73. Therefore, the second operating mechanism 4' is synchronized with the first operating mechanism 4. When each of the second links 43, 43' is rotated in the clockwise direction in FIG. 1 by the rotation of the second output shaft 65 and the fourth output shaft 73, each of the first links 42, 42' is slid toward the lower direction in FIG. 1 along the guide rails 41, 41' so as to be rotated in the counter clockwise direction in FIG. 1. Therefore the movable member 3 is projected out from the deflecter 2 by the first operating mechanism 4 and the second operating mechanism 4'. In this movement of the movable member 3, the first links 42 and 4' (rotatable and slidable movement) are completely synchronized because of the differences in length A and angle B between the second links 43 and 43'. Only one of the differences of length A and angle B may be provided between the second links 43 and 43'. The differences in length A and angle B may be provided between the first links 42 and 42'. Furthermore, each of the first links 42, 42' engages the other ends 52b of the spring members 52 because of the rotatable and slidable movement of the first links 42, 42'. Later each of the first links 42, 42' continues to compress the spring members 52 through the rotatable and slidable movement. When the first links 42, 42' engages the stopping members 53, the electric motor 62 is powered down by overload detecting means and the movable member 3 reaches the operational condition B shown in FIGS. 1 and 12. Under the operational condition 8 the first links 42, 42' are forced by the spring members 52.

When the electric motor 62 is driven in the opposite direction relative to the above mentioned direction, the second links 43 and 43' are rotated in the counter clockwise direction in FIG. 1. The first links 42, 42' are slid in the upper direction and are rotated in the clockwise direction in FIG. 1. The elastic force which the first links 42, 42' receive by the compressed spring members 52 assists this movement of the first links 42, 42'. When the movable member 3 is received in the deflecter 2, the electric motor 62 is powered down by overload detecting means and the movable member 3 reaches the unoperational condition A shown in FIGS. 1 and 11.

The second operating mechanism 4' is completely synchronized with the first operating mechanism 4 because the second operating mechanism 4' is directly driven by the driven mechanism 7 through the connecting shaft 8 without the movable member 3. Therefore the interference of the movable member 3 with the deflecter 2 under the unoperational condition A and the inclination of the movable member 3 under the operational condition B are prevented. Furthermore the movable member 3 may be enlarged in order to expand the visibility because the second operating mechanism 4' is completely synchronized with the first operating mechanism 4.

Furthermore because the connecting shaft 8 is connected with the first operating mechanism 4 and the second operating mechanism 4' by the first output shaft 64 and the third output shaft 72, the connecting shaft 8 can be disposed at any portion in the deflecter 2 regardless of the location of the second links 43, 43'. Therefore the connecting shaft 8 can be disposed in the deflecter 2 without increasing the thickness C shown in FIG. 1 and without making the size and weight of the deflecter 2 bigger.

Operations of the covers 9 will be described hereinafter. In FIG. 13 when the second links 43, 43' are rotated in the clockwise direction in the process from the unoperational condition A to the operational condition B, the covers 9 are forced in the clockwise direction by the third links 10. Therefore the lower portions 2ba are exposed.

In contrast, when the second links 43, 43' are rotated in the counter clockwise direction shown in FIG. 13 in the process from the operational condition B to the unoperational condition A, the covers 9 are pulled in the counter clockwise direction by the third links 10. Therefore the lower portions 2ba are covered by the covers 9.

In FIG. 14 when the second links 43, 43' are rotated in the clockwise direction in the process from the unoperational condition A to the operational condition B, the covers 9 are forced in the clockwise direction by the second links 43, 43' against the elastic force from the spring members 11 toward the upper direction. Therefore the lower portions 2ba are exposed.

In contrast, when the second links 43, 43' are rotated in the counter clockwise direction shown in FIG. 14 in the process from the operational condition B to the unoperational condition A, the covers 9 are pulled in the counter clockwise direction by the elastic force from the spring members 11 toward the upper direction. Therefore, the lower portions 2ba are covered by the covers 9.

In the above mentioned structure, the projecting portions which oppose to the lower portions 2ba are not necessary for the deflecter 2 because the under view mirror apparatus for a vehicle of the present invention comprises a pair of covers 9. Therefore, the convex mirror 32 does not interfere with the projecting portions under the operational condition and secures the visibility in the rear portion of a vehicle.

While the invention has been particularly shown and described with reference to preferred embodiment thereof, it will be understood by those skilled in the art that the foregoing and other changes in form and details can be made therein without departing from the spirit and scope of the invention.

What is claimed is:

1. An under view mirror apparatus for a vehicle comprising:

a mirror structure for being mounted on a rear portion of a vehicle and for being selectively positioned in either one of a first condition in which the mirror structure is stored in a rear portion of the vehicle and a second condition in which the mirror structure projects out from the rear portion of the vehicle;

a first operating mechanism for being disposed between one side of the mirror structure and the rear portion of the vehicle;

a second operating mechanism for being disposed between an opposite side of the mirror structure and the rear portion of the vehicle;

a driving mechanism positionable in the rear portion of the vehicle and connected to the first operating mechanism, said driving mechanism including a driving motor located on the one side of the mirror structure;

a driven mechanism positionable in the rear portion of the vehicle and connected to the second operating mechanism; and a connecting member positionable in the rear portion of the vehicle, the connecting member extending between the one side of the mirror structure and the opposite side of the mirror structure and connecting the driving motor to the driven mechanism so that the first and second operating mechanisms are directly driven by the driving motor.

2. An under view mirror apparatus for a vehicle as recited in claim 1, wherein each of the first operating mechanism and the second operating mechanism includes:

a guide rail for being disposed in the rear portion of the vehicle;

a first link connected to the mirror structure and supported on the guide rail;

a second link connected to one of the first link and the mirror structure; and the second link of the first operating mechanism having a length that is different from the length of the second link of the second operating mechanism.

3. An under view mirror apparatus for a vehicle as recited in claim 1, wherein each of the first operating mechanism and the second operating mechanism includes:

a guide rail for being disposed in the rear portion of the vehicle;

a first link connected to the mirror structure and supported on the guide rail;

a second link connected to one of the first link and the mirror structure; and the second link of the first operating mechanism being inclined at an angle of inclination that is different from an angle of inclination of the second link of the second operating mechanism.

4. An under view mirror apparatus for a vehicle as recited in claim 1, wherein the driving mechanism includes:

a first output shaft connected to the driving motor and the connecting member;

a second output shaft connected to the driving motor, the first operating mechanism and the first output shaft; and the driven mechanism including:

a third output shaft connected to the connecting member; and a fourth output shaft connected to the third output shaft and the second operating mechanism.

5. An under view mirror apparatus for a vehicle comprising:

a mirror structure mountable on a rear portion of a vehicle and selectively positionable in either one of a first condition in which the mirror structure is stored in the rear portion of the vehicle and a second condition in which the mirror structure projects out from the rear portion of the vehicle, said mirror structure having two sides;

a pair of operating mechanisms each positionable between one side of the mirror structure and the rear portion of the vehicle;

a driving mechanism positionable in the rear portion of the vehicle and connected to one of the operating mechanisms; and a pair of rotatable covers which are each connected to one of the operating mechanisms, the rotatable covers being rotatable relative to the mirror structure.

6. An under view mirror apparatus for a vehicle as recited in claim 5, wherein each operating mechanism includes:

a guide rail positionable in the rear portion of the vehicle;

a first link connected to the mirror structure and supported on the guide rail;

a second link connected to one of the first link and the mirror structure; and wherein the under mirror apparatus for a vehicle further comprises:

a third link connected to the second link and one of the covers.

7. An under view mirror apparatus for a vehicle as recited in claim 5, wherein each operating mechanism includes:

a guide rail positionable in the rear portion of the vehicle;

a first link connected to the mirror structure and supported on the guide rail;

a second link connected to one of the first link and the mirror structure; and wherein the under mirror apparatus for a vehicle further comprises:

a pair of spring members positionable in the rear portion of the vehicle, each of the spring members forcing one of the covers upwardly; and wherein each of the covers is engageable with one of the second links so as to be rotated downwardly.

8. An under view mirror apparatus for a vehicle as recited in claim 5, wherein the mirror structure is positionable in a hollow portion of a deflector that is positionable on the rear portion of a vehicle, each of the covers covering a lower portion of the deflector and being connected to a respective operating mechanism by a link.

9. An under view mirror apparatus for a vehicle comprising:

a mirror structure for being mounted on a rear portion of a vehicle and for being selectively positioned in either one of a first condition in which the mirror structure is stored in a rear portion of the vehicle and a second condition in which the mirror structure projects out from the rear portion of the vehicle;

a first operating mechanism for being disposed between one side of the mirror structure and the rear portion of the vehicle;

a second operating mechanism for being disposed between an opposite side of the mirror structure and the rear portion of the vehicle;

each of the first operating mechanism and the second operating mechanism including a guide rail for being disposed in the rear portion of the vehicle, a first link connected to the mirror structure and supported on the guide rail, and a second link connected to one of the first link and the mirror structure, the second link of the first operating mechanism having a length that is different from the length of the second link of the second operating mechanism;

a driving mechanism positionable in the rear portion of the vehicle and connected to the first operating mechanism;

a driven mechanism positionable in the rear portion of the vehicle and connected to the second operating mechanism; and a connecting member positionable in the rear portion of the vehicle for connecting the driving mechanism and the driven mechanism.

10. An under view mirror apparatus for a vehicle comprising:

a mirror structure for being mounted on a rear portion of a vehicle and for being selectively positioned in either one of a first condition in which the mirror structure is stored in a rear portion of the vehicle and a second condition in which the mirror structure projects out from the rear portion of the vehicle;

a first operating mechanism for being disposed between one side of the mirror structure and the rear portion of the vehicle;

a second operating mechanism for being disposed between an opposite side of the mirror structure and the rear portion of the vehicle, each of the first operating mechanism and the second operating mechanism including a guide rail for being disposed in the rear portion of the vehicle, a first link connected to the mirror structure and supported on the guide rail, and a second link connected to one of the first link and the mirror structure, the second link of the first operating mechanism being inclined at an angle of inclination that is different from an angle of inclination of the second link of the second operating mechanism;

a driving mechanism positionable in the rear portion of the vehicle and connected to the first operating mechanism;

a driven mechanism positionable in the rear portion of the vehicle and connected to the second operating mechanism; and a connecting member positionable in the rear portion of the vehicle for connecting the driving mechanism and the driven mechanism.

* * * * *